United States Patent [19]

Luke

[11] Patent Number: 4,651,576

[45] Date of Patent: Mar. 24, 1987

[54] GYROSCOPE HAVING TEMPERATURE CONTROLLING ARRANGEMENT

[75] Inventor: Paul D. Luke, Bracknell, England

[73] Assignee: British Aerospace plc, London, England

[21] Appl. No.: 660,205

[22] Filed: Oct. 12, 1984

[30] Foreign Application Priority Data

Oct. 13, 1983 [GB] United Kingdom ............... 8327436

[51] Int. Cl.⁴ .................. G01C 19/04; G01C 19/30
[52] U.S. Cl. .................. 74/5.46; 74/5.6 E; 318/473; 318/634; 361/140
[58] Field of Search ................. 74/5.46, 5.6 E; 361/140, 24; 318/634, 635, 472, 473

[56] References Cited

U.S. PATENT DOCUMENTS

| | | | |
|---|---|---|---|
| 3,264,528 | 8/1966 | Leifer | 361/140 |
| 3,843,945 | 10/1974 | Koning | 361/140 X |
| 3,939,403 | 2/1976 | Stassart | 361/140 X |
| 4,225,812 | 9/1980 | Kraus | 318/473 X |

FOREIGN PATENT DOCUMENTS

| | | |
|---|---|---|
| 0009347 | 4/1980 | European Pat. Off. . |
| 32213 | 9/1971 | Japan .................. 318/473 |
| 2117118 | 10/1983 | United Kingdom . |

Primary Examiner—Rodney H. Bonck
Attorney, Agent, or Firm—Cushman, Darby & Cushman

[57] ABSTRACT

Gyroscopes, particularly those with permanent magnet torquers, may be temperature sensitive. A temperature signal may be derived and used to correct the temperature dependent parameters such as gyro scale factor. Herein, instead of or in addition to such correction, it is proposed to regulate the gyro temperature by varying the torquer signals and hence controlling the power dissipated in the torquer coils. The torquer signals may comprise positive- and negative-going pulses of fixed amplitude and having respective durations appropriate to produce the required torquing effect. Then, the dissipated power can be controlled by varying the durations of the inter-pulse dead-zones.

2 Claims, 4 Drawing Figures

GYROSCOPE HAVING TEMPERATURE CONTROLLING ARRANGEMENT

Gyroscopes are often temperature sensitive, particularly for example where the gyroscope comprises a permanent magnet torquer arrangement with a samarium-cobalt magnet. This material is a useful one for magnets because it gives a high energy product and coercivity. Unfortunately it also has a high reversible temperature coefficient of remanence. This may render the so-called gyro scale factor, and various other gyroscope operating parameters, strongly temperature sensitive.

It is known to mount a temperature sensor within the gyroscope casing and to use this to form a scale factor correcting signal. Such a sensor however can only measure the temperature of the gyroscope as a whole, whereas it is the temperature of the torquer magnets in particular which have the greatest influence on scale factor. Our UK patent specification No. 2,117,118 discloses a way of deriving a torquer magnet temperature indicative signal from the reference signals generated in the torquer loop pick-up coils and of using this signal to regulate the gyro scale factor.

It would be useful however if, instead of or as well as compensating parameters such as gyro scale factor for magnet temperature, the actual temperature could be regulated.

It is an object of the invention to provide such regulation.

According to one aspect of the invention, there is provided a gyroscope comprising a gyro wheel, at least one gyro rate feedback loop incorporating permanent magnet torquer means, and a magnet temperature regulating loop including means for deriving a signal indicative of the temperature of the torquer means, and control means connected to the temperature signal deriving means and said gyro rate feedback loop and operable to regulate the torquer means temperature by varying the torque inducing signals fed to the torquer means to vary the power dissipated in the torquer coils.

According to another aspect of the invention, there is provided gyroscope appartus comprising a gyroscope including a gyro wheel, sensing means for sensing relative movement of the gyro wheel and the gyroscope and permanent magnet torquer means for controlling said relative movement, the apparatus further comprising a control circuit connected to said sensing means and said torquer means for supplying signals to drive the torquer means, said signals taking the form of positive-going and negative-going current pulses having respective durations controlled to vary the torque applied to the wheel, and temperature regulating means connected to said control circuit and operable for forming a temperature signal indicative of the temperature of said torquer means and for controlling in dependence upon the said temperature signal the dead-zone period between said positive- and negative-going current pulses.

For a better understanding of the invention, reference will be made, by way of example, to the accompanying drawings, in which.

Figure 1:
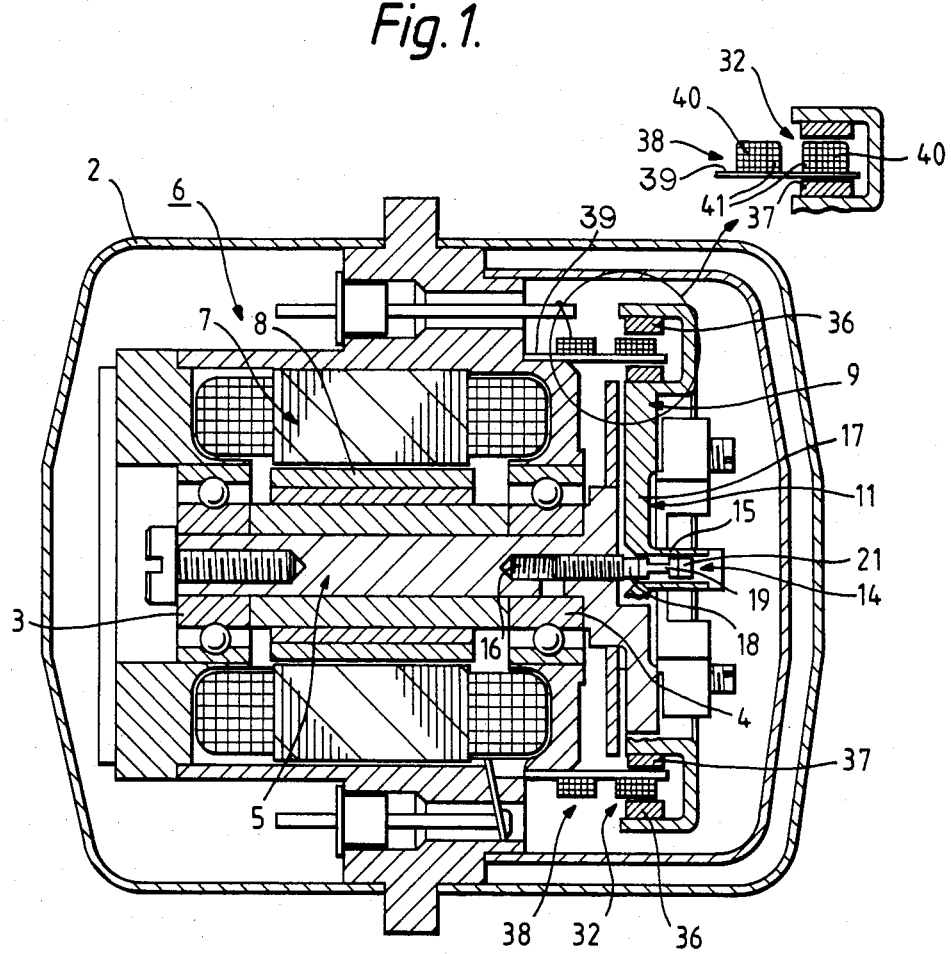
FIG. 1 is a sectional elevation of a gyroscope.

The gyroscope of FIG. 1 is generally similar in mechanical construction to the gyroscope disclosed in the Applicant's European Patent Specification No. 0,009,347. The gyroscope comprises a casing or housing 2 which acts as a magnetic shield for its contents and within which are mounted anti-friction bearings 3 and 4 which journal a drive shaft 5 about its geometrical spin axis. The drive shaft 5 is rotated by a generally conventional synchronous hysteresis spin motor 6 having a stator 7 and a rotor 8. The gyroscope has a sensitive element in the form of a wheel 9 radially suspended by a flexure support spider 11 having four equiangularly disposed resilient, thin, flat arms which flexibly support the wheel 9 for rotation about the normal spin axis. The wheel 9 is supported in the spin axis direction by a further flexure support or strut 14 one end of which is fixed into a matching hole 16 in shaft 5 and the other end of which is fixed into a tubular extension 15 of a spoke 17 of wheel 9.

The flexure support 14 consists of a machined cylindrical rod having three flat flexure elements 18, 19 and 21 milled in its active flexure region. The end flexures 18 and 21 lie in the same diametral plane of the support 14, a plane perpendicular to the diametral plane of the intermediate flexure 19. The flexure element 19 is preferably twice as long as either of the equal length end flexure elements 18 and 21.

Further information concerning the construction of the gyroscope may be obtained from the aforementioned European Patent Specification No. 0,009,347 and from UK Patent Specification No. 2,117,118.

The periphery of the gyroscope wheel 9 defines an annular channel 32 of which the open end faces the hysteresis motor 6 and the walls of which are made of soft magnetic material. Two ring-shaped permanent magnets 36 and 37, each in the form of a flat cylinder of conventional magnetic alloy such as a platinum-cobalt, samarium-cobalt, or other permanent magnetic alloy having similar characteristics, are fixed within the channel, one to the inner surface of the outer channel wall and the other to the outer surface of the inner wall. The magnetic material of each ring is permanently magnetised in the radial direction, for example, at eight equiangularly spaced sites all of which are polarised in the same radial sense. Between adjacent poles, the magnetisation flux in the gap 32 between the two rings falls to a low value or preferably even to zero. Thus a unidirectional magnetic filed resides in the air gap 32, the amplitude of the field varying in a generally sinusoidal or undulating manner around it.

Four equiangularly spaced pairs of coils 38 (only two being seen in FIG. 1) are disposed on a cylindrical member 39 of electrically-insulating material so that one side of each coil of each pair lies within the gap 32. Each pair of coils 38 comprises a torquer coil 40 and a pick-off coil 41 lying coaxially within the coil 40.

Figure 2:
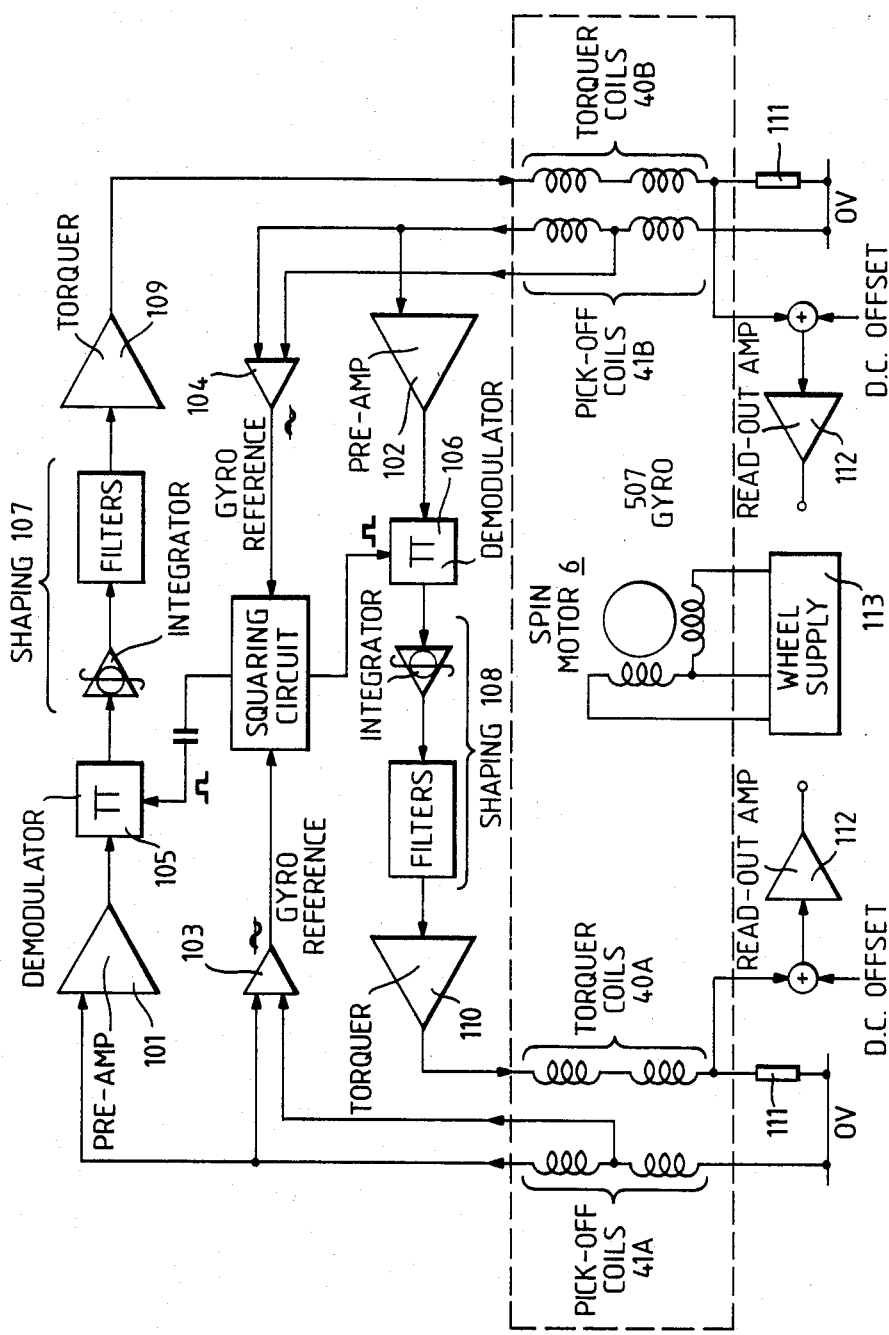
FIG. 2 is a simplified diagram of a gyroscope control circuit.

As shown in FIG. 2, the control circuitry for the FIG. 1 gyroscope comprises two pre-amplifier sections 101 and 102, each configured as a second order low-pass filter cascaded with a second order high-pass filter, producing an overall band-pass function. The two pre-amplifier sections amplify the amplitude-modulated displacement signal developed across respective ones of each two diametrically opposed pick-off coil pairs 41A and 41B. Respective additional amplifiers 103 and 104 are used to sum the signals developed across each pick-off coil in the respective pairs 41A and 41B to produce respective sinusoidal gyro reference signals.

The output of each pre-amplifier section 101 and 102 is fed to a respective demodulator 105 and 106 which synchronously demodulates the amplitude-modulated displacement signal obtained from the pre-amplifier, and accurately reproduces the gyro displacement information in amplitude and phase. A switching demodulator is employed, driven by square waves which are phase-locked to the gyro reference signal.

Respective shaping circuit 107 and 108 are employed to remove unwanted signals produced during demodulation and to provide the filtering and gain terms necessary to give the desired frequency response of the system.

Two torquer amplifiers 109 and 110 are used to convert the voltage signals from the respective shaping circuits into current signals which are driven through the appropriate pairs of gyro torquer coils 40A and 40B. This current interacts with the field established by the wheel magnets to produce a precessional torque. The torque on the wheel acts to null its angular position with respect to the gyro case. The magnitude of the current driven through the torquer coil pairs is a measure of the angular rate applied to the gyro.

In each case, an angular rate output signal is generated across a 2.5 ohm sense resistor 111 which is connected in series with the torquer coils of each axis. A readout amplifier 112 is used to amplify the voltage developed across these resistors and scale the output to a convenient value for computation. An adjustable dc offset to each rate output is provided which allows the fixed bias of the gyro to be removed if required.

The 4-pole hysteresis motor 6 is synchronously driven at 160 Hz by the wheel supply 113. The circuit consists of a precision two-phase oscillator and two power amplifiers (not shown), to give a drive voltage which is stable in both amplitude and phase.

Permanent magnet torquers are used in both rate integrating gyros and flex gyros for wheel precession purposes. They are universally recognised as being small, rugged and extremely efficient.

The most commonly used permanent magnet material is samarium-cobalt since this has the highest energy product and coercivity. Unfortunately this material has a high reversible temperature coefficient of remanence. The flux density in the air gap will typically fall 0.04% per degree C rise in temperature of the magnets. Since the gyro torquer scale factor is directly proportional to the flux density established by the magnets, the scale factor will change by the same proportion with temperature.

Such a large change in scale factor is not acceptable in many strapdown applications and therefore some form of compensation is necessary.

Conventional techniques consist of mounting a temperature sensor within the gyro to measure the gyro temperature. The signal from this sensor can be used to correct the scale factor of the gyro and also parameters such as bias drift which change with temperature.

Errors occur however, because the sensor is measuring the temperature of the gyro body and not the temperature of the torquer magnets. These two temperatures can be different not only because of steady temperature gradients within the gyro but also because the magnet temperature is strongly influenced by the power dissipated in the torquer under dynamic conditions.

When high transient body rates occur, rapid changes in power and therefore magnet temperature occur which may not be seen by a simple temperature device mounted on the gyro body. What is needed is a measure of magnetic flux and changes in flux due to changes in temperature.

In the illustrated gyro, this measurement is made by means of a pick-off system. The basic reference signal generated within the pick-off coils by the modulated magnetic flux as it cuts the coils, gives a measure of the flux strength of the magnets. This signal is used as a frequency source for demodulation purposes after suitable processing.

Changes in magnet temperature either due to changes in ambient temperature or to changes in torquer power, causes a change in flux level. This results in a change in amplitude of the basic reference signal. These changes in the basic reference signal can be detected, suitably processed and used as a measure of the gyro internal temperature as disclosed in UK Patent Specification No. 2,117,118.

If the gyro output is fed through a variable gain readout amplifier then the temperature signal can be used to control the gain of the amplifier. In this way the gyro scale factor can be held constant over the full temperature range.

The present invention relates to a gyro wherein control of the temperature of the torquer magnets is by varying the power of dissipation in the torquer coils. The torquer current is a squarewave consisting of a positive pulse, a negative pulse and a dead-zone. Varying the dead-zone alters the power dissipation in the torquer coils; and by measuring the magnet temperature and dynamically varying the dead-zone, the magnet temperature can be kept constant against ambient variations.

The gyro rate loops alter the ratio of positive and negative pulses per cycle to control the average torque applied to the gyro, and slave the gyro wheel to the gyro case. A high speed up/down counter determines the time the positive and negative pulses are applied and hence provides a digital representing the average current (torque) per cycle which is a measure of gyro rate.

For a constant dead-zone, the power dissipation in the torquer coils is independent of the applied rate and therefore the control loop maintaining the magnet temperature is decoupled from the rate loops.

Maintaining the temperature of the torquer magnets constant will minimise the scale factor temperature coefficient and reduce the temperature coefficients of drift (bias) and g-sensitivity.

Figure 3:
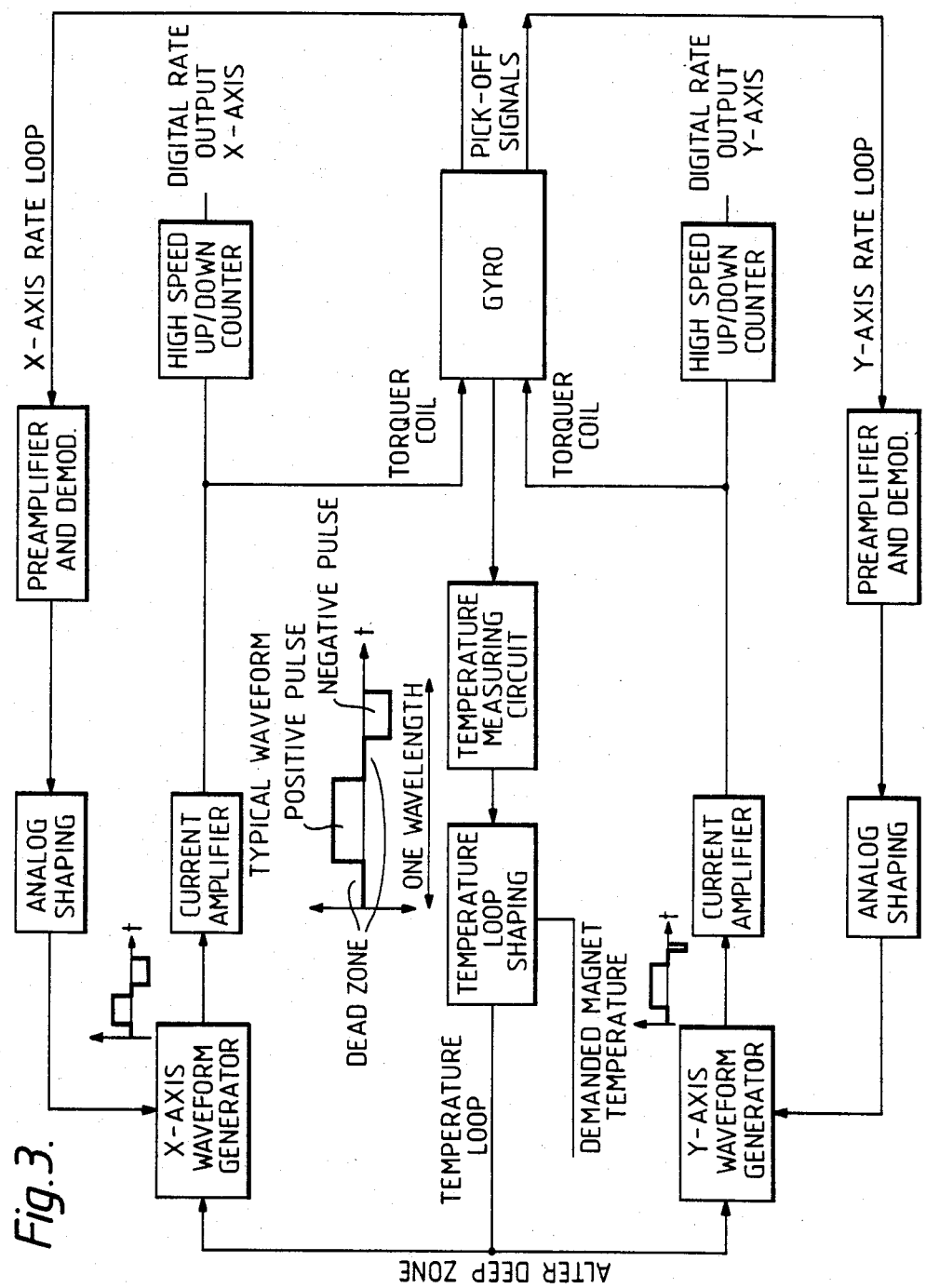
FIG. 3 is a simplified diagram of a gyroscope control circuit incorporating a torquer magnet temperature regulating loop.

A simplified diagram of the proposed system is shown by way of example in FIG. 3. This illustrates the two rate loops and a single temperature loop. The gyro has separate pick-offs and torquer coils and pre-amplifier, demodulation and shaping circuits as described with reference to FIG. 1. It also has magnet temperature sensing circuits of the kind disclosed in our UK Patent Application No. 2,117,118.

Constant magnet temperature operation is achieved using a control loop which compares a voltage representing the magnet temperature with a reference voltage, and adjusts the dead-zone in the current waveform supplying the torquer coils accordingly. An increase in the dead-zone reduces the power dissipated in both axes and the gyro coils. The ability of the loop to reject changes in ambient temperature depends on its order and gain.

Control of the gyro wheel with respect to the gyro case is achieved using two rate loops which are similar to the normal analog rate loops. After demodulation and frequency shaping, the processed pick-off signals control the ratio of the duration of positive and negative pulses, and hence the average current (torque) applied to the gyro wheel. For zero rate input the positive and negative pulses are of equal duration, therefore the average applied torque per cycle is zero.

Since the current pulses are of constant amplitude, the average current (torque) can be determined by calculating the duration of the pulses. By triggering a high speed up/down counter which counts down for a negative input and up for a positive input, a digital word representing the average torque per cycle can be obtained. This word represents the rate applied about one of the gyro sensing axes.

It is important that the rate and temperature control loops are decoupled. The x-axis and y-axis generators can be designed such that:

(i) A change in the rate loop signal alters the ratio of positive and negative pulses and does not alter the dead-zone. Therefore the power dissipated in the torquer coils is independent of applied rate.

(ii) A variation in the temperature loop signal alters the dead-zone while the difference between the positive and negative pulses remain constant. Therefore the average applied torque is independent of the dead-zone, provided saturation has not occurred (i.e. insufficient available torque).

Ambient changes compared to changes in the applied rate will be low and therefore the bandwidth of the temperature loop can be significantly less than that of the rate loops. A target of 60 Hz bandwidth will be set for the rate loops. Pulse torquing at constant dead-zone (constant ambient) produces constant power dissipation and therefore rate changes will not disturb the temperature loop. Since the torquer coils can heat, but not cool the gyro, the torquer coils will be operated close to their maximum temperature.

Figure 4:
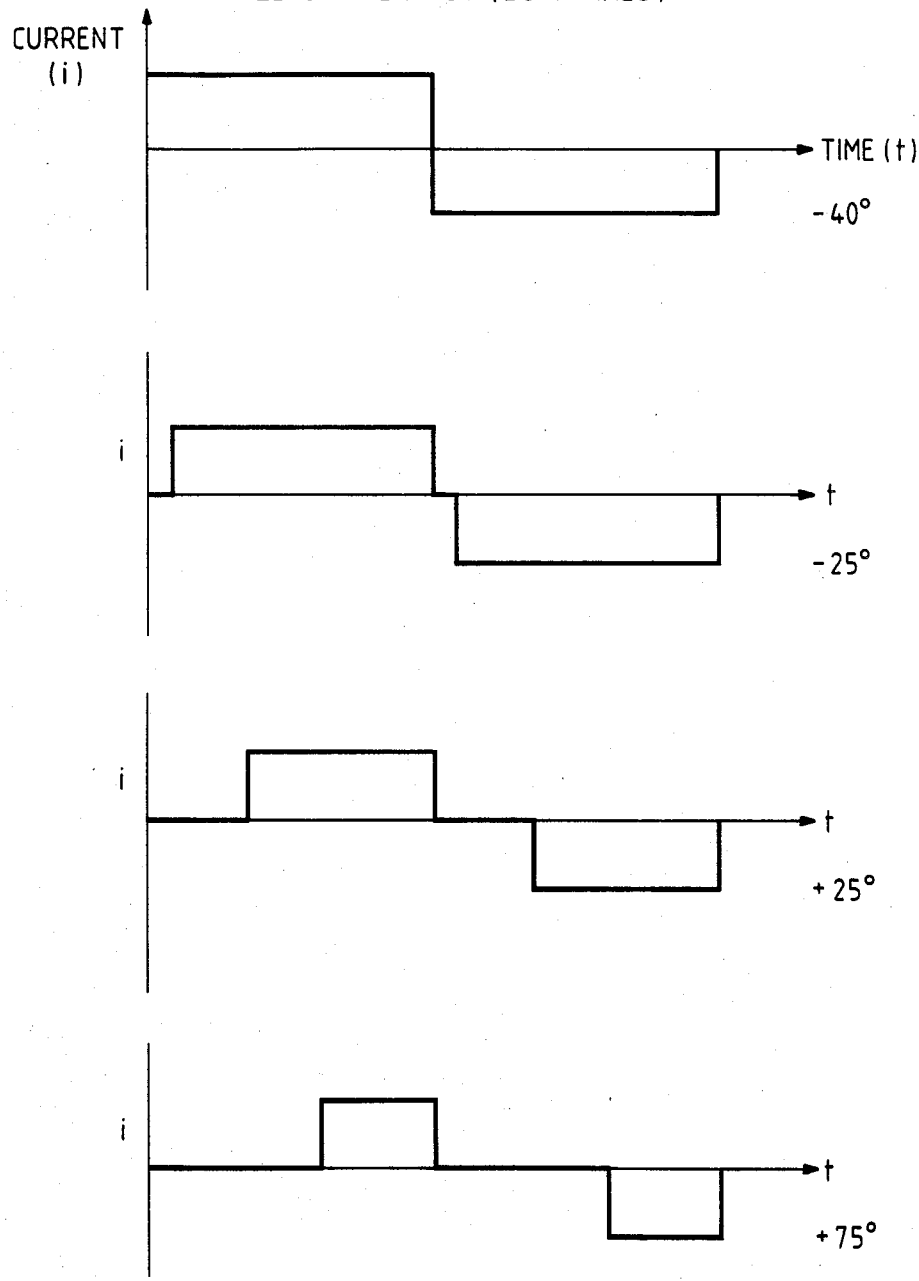
FIG. 4 is a diagram showing the waveforms of torquer coil current pulses generated in the circuit of FIG. 3.

FIG. 4 illustrates the anticipated current waveforms required to maintain the torquer magnets at 150° C. for zero rate input against variations in ambient. At low ambients a relatively large current is necessary to maintain the torquer magnet temperature and therefore larger rates can be measured.

The resolution of the digital word per cycle depends on the speed at which the up/down counter operates when determining the duration of the pulses and the sharpness of the edge of the current pulse.

The system configuration may contain two rate loops and one temperature loop.

Each rate loop will consist of the following functions: demodulator and pre-amplifier circuits, analog notch, analog shaping, voltage-controlled squarewave generator, switching bridges with current source and torquer coil tuning circuits.

The analog demodulation, pre-amplifier and notches are standard circuits. A current source and bridge arrangement is used in place of the standard torquer amplifier. The current source ensures that the positive and negative current pulses are equal and of precise amplitude. A dummy load ensures that current always sees the same impedance and the rise time of the current pulses depends on the speed of the bridge circuit.

Torquer coils are inductive and a parallel tuning network is used to form a resistive load for the bridge circuit. Since the magnets will operate at constant temperature, the variation in coil resistance will be small, therefore the tuning conditions will be stable and a passive tuning network can be used.

On switch-on the torquer magnets will be cold. As the torquer coil time constant is significantly less than the time constant between the coils and magnets, it may be possible to burn out the torquer coils before the magnets warm up and the temperature control loop operates. Initially this can be prevented by limiting the current amplitude. Alternatively, there can be used a circuit determining the coil resistance and hence its temperature from a knowledge of the voltage appearing in the system.

I claim:

1. A gyroscope comprising:
    a gyro wheel,
    at least one gyro rate feedback loop incorporating a permanent magnet torquer having torquer coils, and
    a magnet temperature regulating loop including means for deriving a signal indicative of the temperature of the torquer, and control means, connected to the temperature signal deriving means and said gyro rate feedback loop, for regulating the torquer temperature by varying the torque inducing signals fed to the torquer to vary the power dissipated in the torquer coils.

2. Gyroscope apparatus comprising:
    a gyroscope including a gyro wheel, sensing means for sensing relative movement of the gyro wheel and the gyroscope, and permanent magnet torquer means for controlling said relative movement,
    a control circuit, connected to said sensing means and said torquer means, for supplying signals to drive the torquer means, said signals being positive-going and negative-going current pulses having a dead zone period therebetween and having respective durations controlled to vary the torque applied to the wheel, and
    temperature regulating means, connected to said control circuit, for forming a temperature signal indicative of the temperature of said torquer means and for controlling in dependence upon the said temperature signal the dead-zone period.

* * * * *